(12) United States Patent
Frisch et al.

(10) Patent No.: US 6,186,175 B1
(45) Date of Patent: Feb. 13, 2001

(54) ROCKER VALVE WITH PNEUMATIC PRE-CONTROL

(75) Inventors: Herbert Frisch, Göppingen; Josef Vollmer, Bernbeuren, both of (DE)

(73) Assignee: Hygrama AG, Rotkreuz (SE)

(*) Notice: Under 35 U.S.C. 154(b), the term of this patent shall be extended for 0 days.

(21) Appl. No.: 09/244,099

(22) Filed: Feb. 4, 1999

(30) Foreign Application Priority Data

Feb. 4, 1998 (AT) ........................................ 197/98

(51) Int. Cl.⁷ .................................................. F15B 13/042
(52) U.S. Cl. ................................. 137/625.66; 137/625.44
(58) Field of Search ........................... 137/625.44, 625.66

(56) References Cited

U.S. PATENT DOCUMENTS

| | | | |
|---|---|---|---|
| 3,590,694 | * 7/1971 | Prescott et al. | 137/85 X |
| 4,074,701 | * 2/1978 | Kemmler | 137/625.66 |
| 4,765,370 | * 8/1988 | Arizumi et al. | 137/625.44 X |
| 5,133,386 | * 7/1992 | Magee | 137/625.44 X |

* cited by examiner

Primary Examiner—Gerald A. Michalsky
(74) Attorney, Agent, or Firm—Dykema Gossett PLLC

(57) ABSTRACT

A rocker valve with pneumatic pre-control includes a housing (G) with the pressure means connections (P, A, R, Ps), at least one rocker in the housing which is movable between two final positions about an axis and works together with at least one sealing surface for at least two pressure means connections, where one handle of the rocker can be impacted with a pre-control pressure via a pre-control connection and the rocker in one final position connects one working connection (A) with the supply connection (P) and in the other final position with the ventilation connection (R). To achieve the greatest simplicity of construction and space-savings, the highest possible operational security through the best possible sealing-off of the connections and precision as well as short switching times, two working connections (A1,A2) are provided, from which in each of both of the final positions of the rocker one working connection, respectively, is covered by the rocker and the sealing surface, where a working connection (A1) is separable through the rocker from a supply connection (P) and the second working connection (A2) is separable through the rocker from a ventilation connection (R)

24 Claims, 11 Drawing Sheets

ROCKER VALVE WITH PNEUMATIC PRE-CONTROL

BACKGROUND OF THE INVENTION

1. Field of the Invention

The invention relates to a rocker valve with pneumatic pre-control, including a housing with the pressure means connections, in which housing at least one rocker is arranged which is movable between two final positions about an axis and works together with at least one sealing surface for at least one valve seat of a pressure connection, where one handle of the rocker can be impacted with a pre-control pressure via a pre-control connection and the rocker in one final position locks the valve seat tightly and in the other final position opens to at a maximal diameter.

2. The Prior Art

A rocker valve of this type is, for example, known through a structural design by Samsomatic Automationssysteme GmbH. In so doing, the basic position, in which the supply connection and the working connection are isolated from one another, is maintained through elasticity and the switching, or in other words, the opening of the connection of supply and working connection or the closing, occur pneumatically pre-controlled. The pivotal axis of this arrangement is given by the simple thickening of an elastomer shape sealing, with which the security of the sealing and because of the additional mechanical load of the sealing element also the longevity of the valve can be negatively influenced. Besides this, the valve is kept closed merely through the elasticity and thus has pressure-dependent characteristics; it is only usable up to a predetermined maximum pressure.

Beyond this, rocker valves have been built in various other arrangements, such as the lifting anchor model of Buckert. In this model, a rocker is kept through elasticity in a closing position (supply connection and working connection isolated from one another) and the switching occurs via a lifting magnet which tilts the rocker against the effect of the spring about the pivotal point in the open position. Again, the valve is held closed by merely the elasticity and thus has pressure-dependent characteristics; it is only usable up to a predetermined maximum pressure. Besides this, the valve requires a lot of space because of the electromagnet necessary for switching.

For this reason, it was the object of the present invention to create a rocker valve that is operable purely via pressure means, which can be implemented in a versatile way with as much simplicity of construction and space-savings as possible, is adjustable to a variety of uses, and offers the highest possible operational security through the best possible sealing of the connections and precision as well as short switching times.

This object is solved according to the invention in that, at least on the side of the rocker with a working connection, a sealing is provided between the edge of the rocker and the inner wall of the housing, through which on the side of the rocker with respect to the axis as well as the plane of the rocker a chamber with at least two connections is formed, which chamber is preferably separated from at least one other connection on the opposite side with respect to the rocker plane. In this way the further connections remain secure and tightly separated from both of the other connections on the other side of the rocker, and a precise switching of the valve can be guaranteed, despite rapid switching times and, at the same time, flat construction in regard to the diameter of the opening. Due to the sufficiently small pivotal movements of the rocker, the valve according to the invention can be built to be very small and flat, and can exhibit a layered construction which, in both assembly and repair, allows for the very simple operation of work to be done.

According to the advantageous embodiment of the invention, it is provided that, on both sides of the rocker, a sealing element is provided between the edge of the rocker and the inner wall of the housing; in this way, on each side of the rocker one chamber with at least two connections is formed which connections are preferably separated by at least one further connection on the side that lies on the opposite side with respect to the rocker plane. In this way, the versatility of the valve according to the invention is further expanded, since with this structural design, while maintaining the speed and precision of switching, many different occupancies of the connections and thus many uses are made possible.

According to one embodiment of the invention, two working connections are present from which, in each of both of the final positions of the rocker, one working connection each is covered by the rocker and the sealing surface, whereby one working connection is separable by the rocker from one supply connection and the second working connection is separable by the rocker from one ventilation connection. Thus, a valve construction with the smallest impairment spaces is made possible which guarantees in all embodiments, also upon activation of the pressure means and even for large outlet cross-sections, rapid switching times and precise sealing function.

According to a further embodiment of the invention, an NO-valve (normal condition, that is, without pre-control, open) can be realized in a simple manner in that the effective area, surface of application for the supply pressure against the movable parts of the valve is larger than the area of the outlet of the second working connection connected to the ventilation connection.

To realize a 2/2-way valve in a simple manner and with the above-mentioned advantages, provided according to another embodiment of the invention, is that, on merely one side of the rocker, two connections are provided in one chamber, which chamber is limited by the elastic sealing element extending from the edge of the rocker to the inner wall of the housing.

If at least two rockers are provided in on housing as connected parallel to one another, a very rapid and precise 4/2 or 5/2 way valve of a small structural height and all of the other already-mentioned advantages can be manufactured.

Advantageously, it is provided that the rocker is positioned substantially symmetrical about the axis of rotation. This facilitates the assembly of the valve and its reconstruction in different embodiments and the arrangement with respect to the switching pressures and times. Slight deviations in the total symmetry with respect to the area ratios of the pressure means outlets and effective areas for the application of the pressures are possible for the arrangement of a precise switching behavior, for example, for achieving a switching hysteresis.

To advantageously guarantee the easy mobility of the rocker and rapid switching times along with simple construction and assembly, the outer edge of the rocker is, at least over a part of its length, distanced from inner wall of the housing, and at least one sealing element extending between the edge of the rocker and the inner wall of the housing, preferably an elastomer sealing element, is provided.

If, according to a further embodiment, the sealing element is arranged as one piece with at least one sealing surface for the connection is preferably as one piece with both sealing surfaces, and extends to both sides of the rocker, an especially simple construction with minimal number of parts is thus provided which furthermore, is very functionally secure and has a long life.

To obtain a very flatly built structural design which can also be simply placed onto existing connection plates, and on which again pre-control or magnet control valves can be placed, it is provided that the supply connection, the working connections and the ventilation connection are arranged in the same half space with respect to the plane of the rocker, where the supply connection and the ventilation connection lie opposite one another with respect to the axis of rotation of the rocker, and that the pre-control connection is located in the half space that lies opposite the rest of the connections with respect to the plane of the rocker.

According to an advantageous embodiment of the rocker valve according to the invention, it is provided that, between the handle of the rocker and the housing, a spring element is inserted into this handle of the rocker with a force, by which the rocker in the pressure-less condition of the rocker valve is held in a defined final position and also the movement of the rocker is supported. Even at a first-time switching or in transitional conditions during the switching, unstable positions are prevented and thus the largest possible switching security and precision is guaranteed. Also, the spring element supports the effect caused by the pressure means on the rocker and, in such a way, can support, for example, the closing effect.

The same advantageous effect can be achieved by a sealing element which prefers a final position and biases the rocker into this final position, where the sealing element is preferably arranged in the shape of a crimped elastomer membrane.

According to a special, advantageous embodiment of the invention, the pre-control connection opens on the side of the handle of the rocker which separates the working connection from the ventilation connection. In so doing, the lever action upon application of the pre-control pressure to overcome the pressure at the supply pressure connection can have the optimal effect.

If, according to a further embodiment of the invention, an access is provided for the supply pressure into the housing space and lying opposite the housing space into which the supply pressure connection and one of the working connections open is provided, a structural design of the valve with the highest possible pressure independence is ensured. The supply pressure which also, on the side lying opposite the supply connection and its corresponding working connection, has an effect on the rocker, compensates for the torque that has an effect on the rocker, so that it can be held securely by means of slight, additional forces in the closing position. Thus, no principle maximal pressure with respect to the secure functioning of the valve according to the invention exists and, depending on the area ratio of both handles of the rocker including the corresponding sections of the sealing element, the pre-control pressure necessary for opening the valve can be equal to the supply pressure or equal to a fraction of the supply pressure.

In a manner that is structurally simple and does not influence the structural size of the valve, the above-mentioned torque compensation can be achieved in that, in the handle of the rocker which separates the supply connection from the working connection and/or the corresponding section of the sealing element, at least one through-opening is provided in the housing space lying opposite the supply connection.

If, advantageously, the axis of rotation of the rocker is defined by at least one crosspiece of the housing, onto which the rocker lies, preferably by two crosspieces lying opposite one another, between which the rocker is inserted, the rocker has an exactly defined axis of rotation through this direct housing support. This results in a better sealing, an even more precise switching and, through minimization of the mechanical service conditions of the sealing element, a lengthening of the life of the valve. Of course, in order to allow for the deflection of the rocker, there must always be enough play between the rocker and the crosspieces.

If that or every crosspiece is sealed off through a section of a circling sealing of the sealing element, a simple structural design, a secure installation and a secure functioning is guaranteed.

The sealing can be arranged, according to an advantageous embodiment, in the area of the crosspiece as a lip sealing with sealing lips bent away from the crosspiece. Therefore, the pre-stress necessary for the best possible sealing in the area of the crosspiece does not cause any congestion of the sealing and thus exercises only a minimal force onto the rocker itself. The power and torque ratios at the rocker are mainly determined through the pneumatic pressures and are not negatively influenced by the pre-stress of the sealing.

According to a further advantageous embodiment, also the axis of rotation of the rocker can be defined by at least one crosspiece of at least one of the sealing elements, which crosspiece is taken up in corresponding cavities of the housing, preferably through two crosspieces on opposite sides of the sealing element. This allows for a somewhat more flexible storage with, in some cases, an easier tilting of the rocker.

In order to hold the rocker securely and to guarantee a stable connection between the rocker and the sealing element, a preferred embodiment has the rocker embedded in a one-piece sealing element.

If there are fewer requirements, a more simply manufactured variation is imaginable in which the rocker is mounted onto the surface of a one-piece sealing element, preferably on the side opposite the valve seats to be sealed off, and fixed onto it.

Equally simple in terms of manufacturing is an embodiment of the rocker valve according to the invention, in which the rocker is embedded between two separate sealing elements, where the sealing elements are preferably held at a distance to one another in the insertion area by means of one housing crosspiece or an additional part with preferably the same thickness as the rocker. In so doing, the additional, distancing part or the equivalent crosspiece in the housing ensures a minimization of the mechanical load of the sealing element as well as their better seating and thus ensures the sealing effect as well as an increased mobility of the rocker. The increased mobility can be even more improved by the layering of the side of the sealing element facing the rocker with a lubricant or a sliding layer.

Advantageously, the space between both of the sealing elements is ventilated, so that no negative influence of the power and torque ratios on the rocker can occur.

According to another embodiment, the rocker has, at least in the area of the edge, a cavity in which the edge of the sealing element facing away from the housing is held as inserted and sealed off. In so doing, based on the rocker that is kept free from the sealing element or other elastomer material, a precisely defined situating of the rocker in the area of the crosspiece is guaranteed.

For simpler manufacturing and maintenance it is, thus, advantageously provided that the rocker consist of two plates lying over and directly against one another preferably, in the area of the crosspiece, where the outer edges of the plates are at a distance to one another and the inner edge of the sealing element is inserted in between like a sandwich.

A structural design is advantageous during assembly and repair which includes a frame as an additional part, which frame also has a bearing for the axis of rotation of the rocker. At the same time, the axis of rotation of the rocker is exactly defined, through which a secure sealing effect and thus, highest functional security is guaranteed.

The sealing effect and thus the functional security of the valve according to the invention can be optimally guaranteed in that the rocker itself has such an expansion that every opening of every working connection is covered.

In an advantageous manner, a rocker valve can be used according to one of the previous paragraphs as a simple, cheap and functionally secure logic element.

The invention will be better understood by reference to the attached drawings taken in conjunction with the following discussion.

DETAILED DESCRIPTION OF THE PREFERRED EMBODIMENTS

A rocker 1 that is moveable about an axis of rotation and is substantially rigid (made of, for example, metal) is mounted in a valve housing G. The rocker 1 is embedded in an elastomeric sealing element 2, which for higher pressures is preferably enforced with wire mesh, and the axis of rotation is defined by at least one crosspiece 6 in the housing G. Of course, the rocker 1 could also be mounted on a side thereof and be fixed to it, so that the rocker 1 is taken along by the elastomer sealing element 2 and can exercise a lifting and pulling effect. Also, a rocker locked in between two separated sealing elements 2 like a sandwich or, vice versa, a rocker 1 holding the sealing element 2 between two plates like a sandwich is possible (refer to FIGS. 7, 9a and 9b).

The housing has a plurality of connections for the pressure fluid, where, depending on the occupancy of these connections or also the holding closed or non-occupancy of these connections, different valve functions can be achieved, for example, 2/2-way valves, 2/2-way ventilation valves, 3/2-way valves or the like. Finally, also a plurality of, or at least two rockers, can be provided in a housing as connected in parallel to one another, where in known manner for previously known valve arrangements 4/2-way valves and 5/2-way valves with very flat construction and faster and more precise switching can be realized.

Figure 1A:
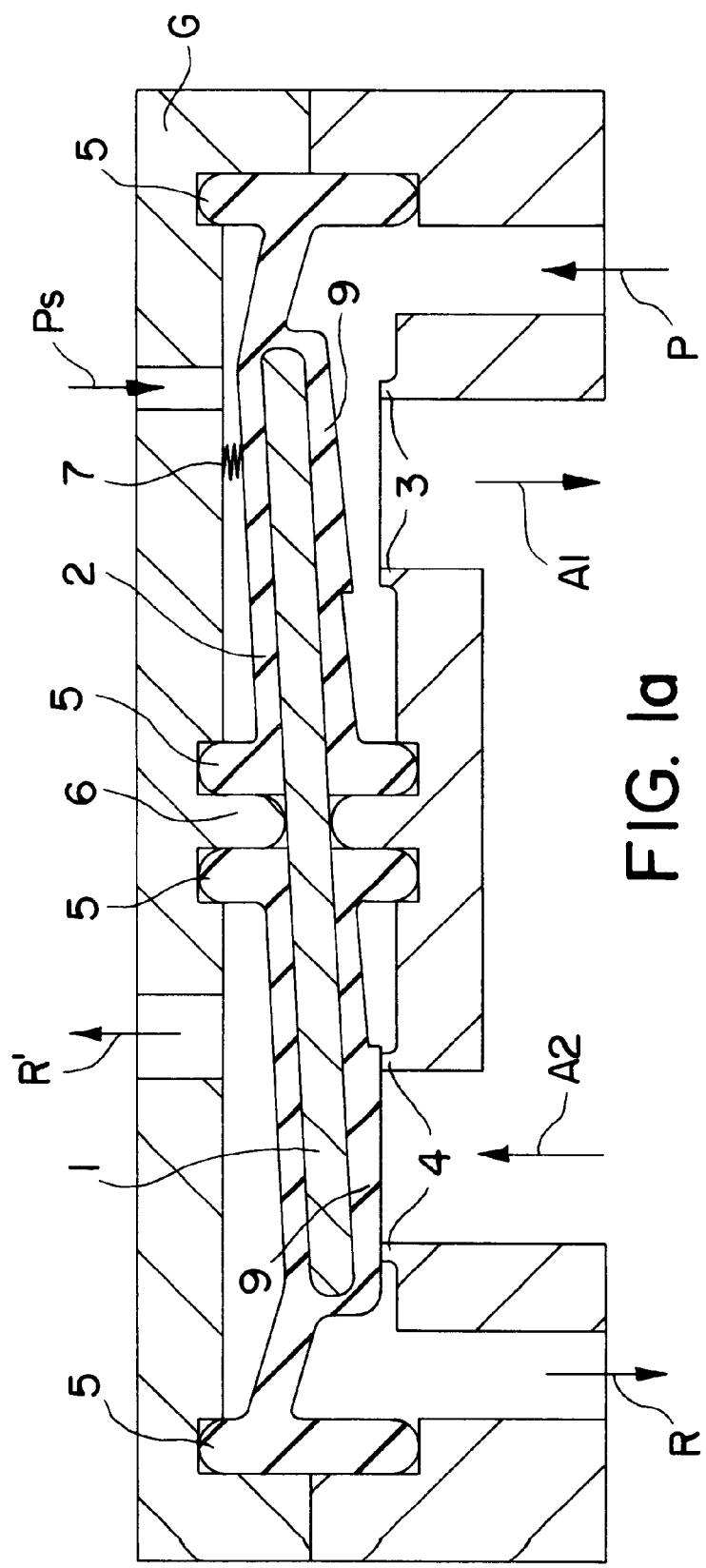
FIG. 1a shows a lateral cross-sectional view of a first embodiment of a rocker valve according to the invention as a 3/2-way valve.

In FIG. 1a, a 3/2-way valve of a rocker construction according to the invention is shown, which has at least one supply connection P for a pressure fluid and two working connections A1 and A2, as well as also one ventilation connection R. A working connection A1 is directly next to the supply connection P and the second working connection A2 is directly next to the ventilation connection R. Both working connections A1 and A2 lead to the same working volume and are connected in the valve housing G or outside of it, subject to any possible intermediate switching of a throttle. Of course, also two pressure fluid lines, one from each of the working connections, can lead to the working volume.

The connections P, A and R are, in an advantageous embodiment which is flatly built and easy to place onto even connection plates, arranged all on the same side of the rocker 1 with respect to that plane. The outlet of the one working connection A1 forms, at the position that is connected to the supply connection P through lifting of the rocker 1 (in all of the drawings as examples on the right side), a first valve seat 3. At the position of the connection of the ventilation connection R (in the exemplary drawings on the left), to the outlet of the second working connection A2, a second valve seat 4 is formed. In FIG. 1, a normally open valve (NO-valve) in its open, basic position which is automatically effected from connection P through the supply pressure applied at the appropriated (here the right) handle of the rocker 1 and the corresponding part of the elastomer sealing element 2, as long as the pressure at the pre-control connection Ps is kept sufficiently low and thus no closing torque has an effect on the rocker 1. The pre-control pressure necessary for the closing of the valve depends on the geometry of the rocker 1 and, in a substantially symmetrical rocker 1 including sealing element 2 through the supply pressure also applied against the working connection A2 (via the connected working volume), is in any case smaller than this supply pressure, as long as the area of the valve seat 4 is smaller than the point of application for the supply pressure on the side of the valve seat 3. In all cases, a portion of the force necessary to keep the valve open can be generated via a spring element which opens the rocker 1. However, an exactly defined final position is given which is maintained even in the pressure-less condition. Also, the spring element can support the movement of the rocker. To facilitate the closing movement, advantageously, an additional ventilation outlet R' can be provided on the side of the rocker 1 opposite the valve seat 4.

Figure 1B:
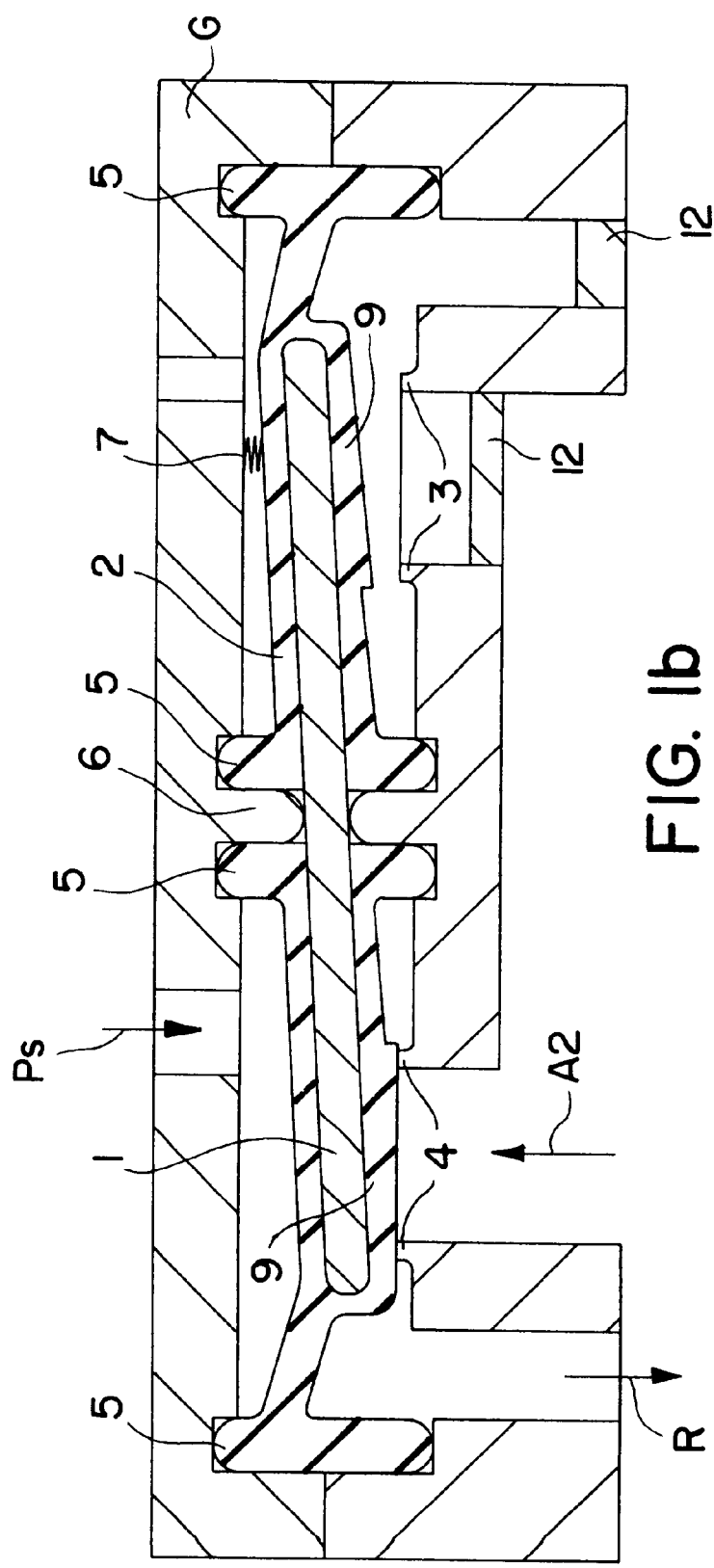
FIG. 1b is a valve which is the same as FIG. 1a with a closed supply pressure connection and first working connection and with a moved control pressure connection as a 2/2-way ventilation connection.

In the 2/2-way ventilation valve variation of FIG. 1b the supply connection and the first working connection are closed using a stopper 12 or are simply not occupied; the valve seat 3 and the corresponding sealing surface 9, therefore, lack functionality. If one does not want to make use of the counter force due to the compression of the air in the lower right space of the valve, this space is preferably ventilated into the atmosphere or connected to the right upper space to allow for a transvection of the air. This applies in the general sense, of course, for all corresponding embodiments. Also, the control connection is moved to the other side and serves for the switching of the valve using the control pressure Ps on the (as shown in the drawing as left) handle of the rocker 1. When the valve is open, that is, when the sealing surface is lifted up from the valve seat 4, the second working connection A2 is ventilated via the connection R; when the rocker 1 is opened using the control pressure Ps, the sealing surface 9 is pressed onto the valve seat 4 and the valve is closed.

Figure 2A:
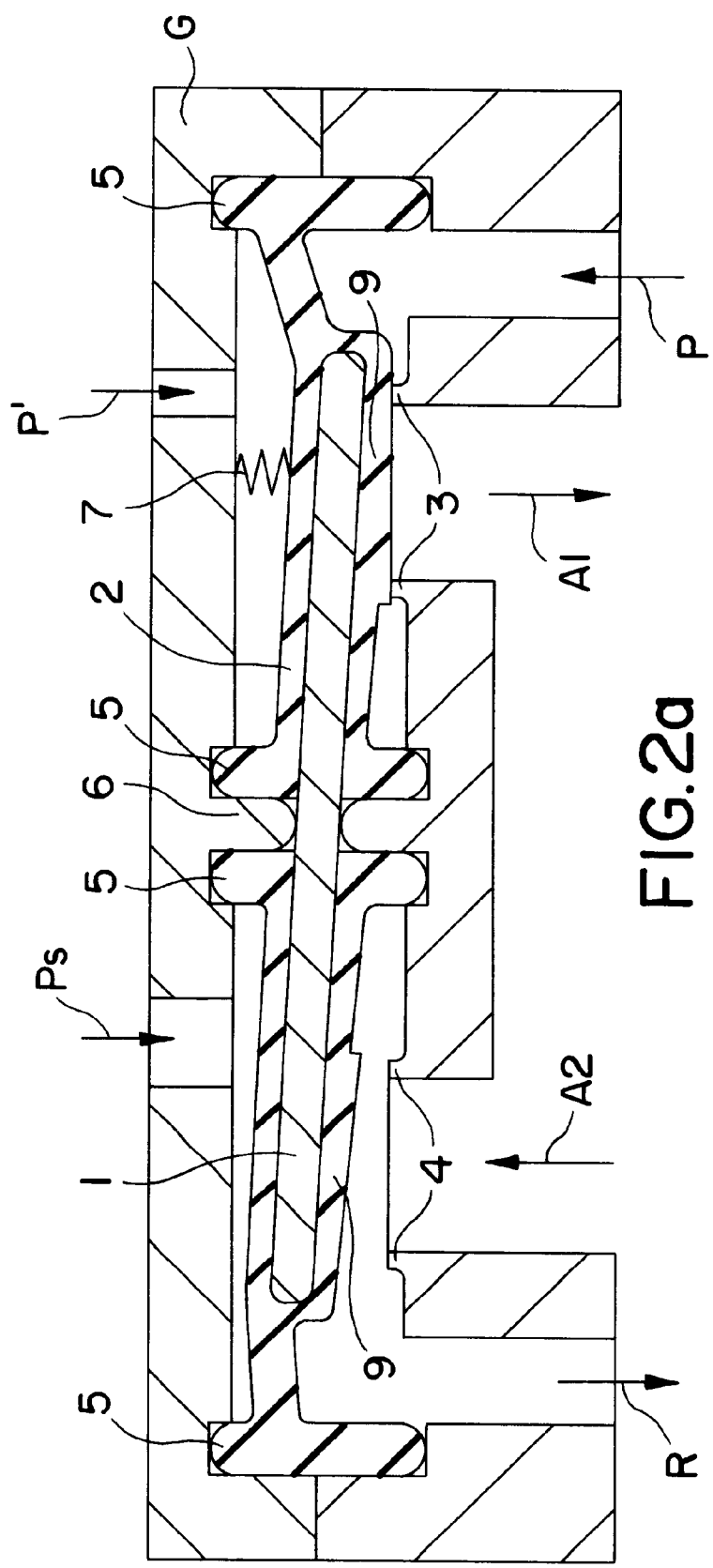
FIG. 2a is a view like FIG. 1 of another embodiment of a rocker valve according to the invention with a pressure compensation.

A further embodiment of the rocker valve according to the invention, here again as a 3/2-way valve, is shown in FIG. 2a, which is here a normally closed valve (NG-valve). There is in the housing space of the valve opposite the supply connection P and the corresponding working connection A1, that is, on the side of the rocker 1 opposite the mentioned connections with respect to the rocker plane, an additional connection provided for the supply pressure which, however, cannot be connected to the working connection, but instead serves to impact the corresponding handle of the rocker 1 including the sealing element 2 on both sides with the supply pressure and to largely compensate torque-wise in such a way. Regardless of how large the supply pressure is set to, there is no danger in this arrangement that the valve is pushed into the open position by a supply pressure that is too high, since it is always applied to both sides of the rocker 1. At suitable geometry which is mostly given by the mere fact that the area of the outlet of the working connection A1 on the side of the rocker 1 must be subtracted, on which the opening torque acts, also a holding of the valve in the closing position can be guaranteed by the supply pressure alone. The valve works advantageously in principle independent of pressure.

Any spring element 7 between rocker 1 and housing G can place the rocker 1 in the closing position and, thus, can ensure a precisely defined final position and/or support the closing effect. The opening of the valve is conducted by means of a pre-control pressure applied via the pre-control connection P which acts on the handle of the rocker 1 which lies opposite the supply connection P and the working connection A1. In the closed position of the valve, as shown in FIG. 2a, the rocker 1 is pressed completely onto the valve seat 3 and, in such a manner, separates the supply connection P from the right working connection A1, while the working volume is ventilated via the second working connection A2 via the ventilation connection R.

Figure 2B:
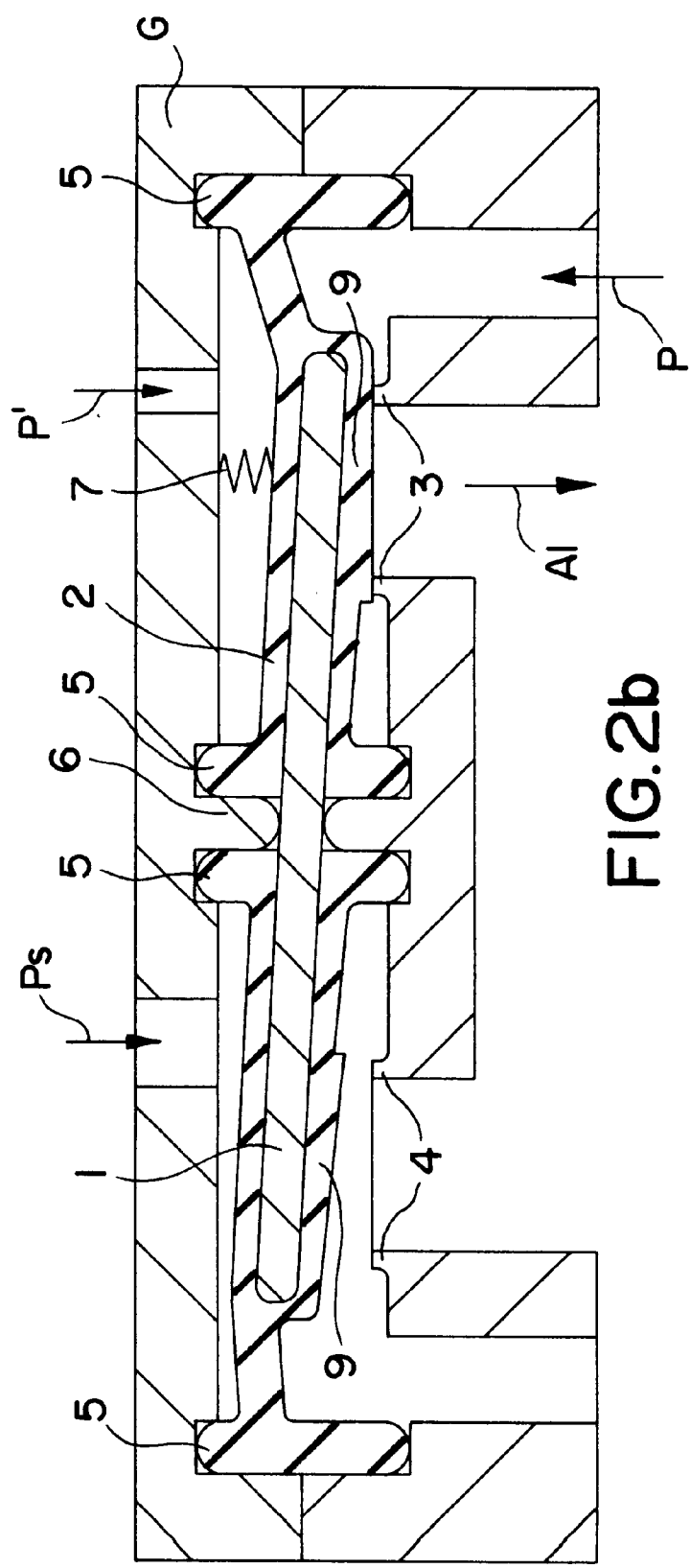
FIG. 2b is a valve which is the same as FIG. 2a with a non-occupied second working connection and ventilation connection as a 2/2-way valve.

The advantage of the pressure-compensated construction can, of course, also be used in a 2/2-way valve variation as, for example, shown in FIG. 2b. Here the working connection, shown on the left in the drawing, and the ventilation connections are not occupied or also closed, while the control pressure connection remains furthermore on the left side of the rocker, that is, opposite the connections to be switched. On the basis of the pressure and area ratios on the right handle of the rocker 1 as already explained in connection with FIG. 2a, the 2/2-way valve of FIG. 2b normally remains closed and is opened by impacting the left handle of the rocker 1 with the control pressure Ps, which creates the connection of the supply connection to the working volume.

Figure 3:
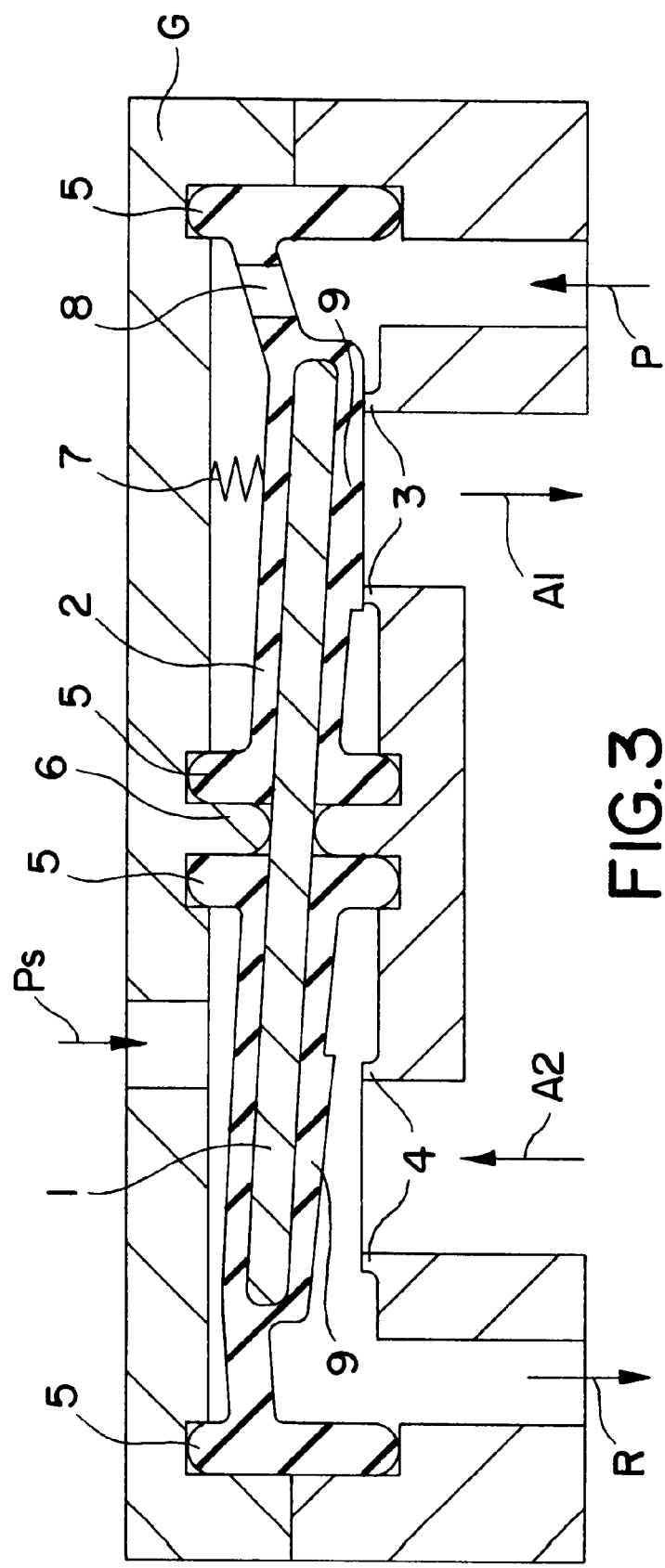
FIG. 3 is a further embodiment of a valve with a pressure compensation in the closing position.

The above-described achievement of the pressure independence of the valve and the pressure support during holding of the closed condition of the valve can, however, also be effected in another embodiment of the invention, as shown in FIG. 3, in that the supply pressure can be transmitted, at least, through a through-opening 8 through the elastomer sealing element 2, in any case the rocker itself, on the side of the rocker 1 opposite the supply connection P and the first valve seat 3 of the working connection A1. Only a pressure—as also described in the example above—can be applied via the pre-control connection Ps, which effects a torque on the left side of the rocker 1 that is smaller than the torque applied to the right side of the rocker 1 by means of the supply pressure. The mentioned torque ratio is given again through the pressures applied to the supply connection P and the pre-control connection Ps and the geometry of the rocker 1, including the elastomer sealing element 2. In all cases, the closing effect can also be increased here through a spring element 7 responding to pressure, which spring is inserted between the housing G and the rocker 1. In any case, the spring element 7 also serves to define a defined basic position of the valve even when no pressure is applied or to maintain the unstable middle position of the rocker 1 for as short as possible.

Figure 4:
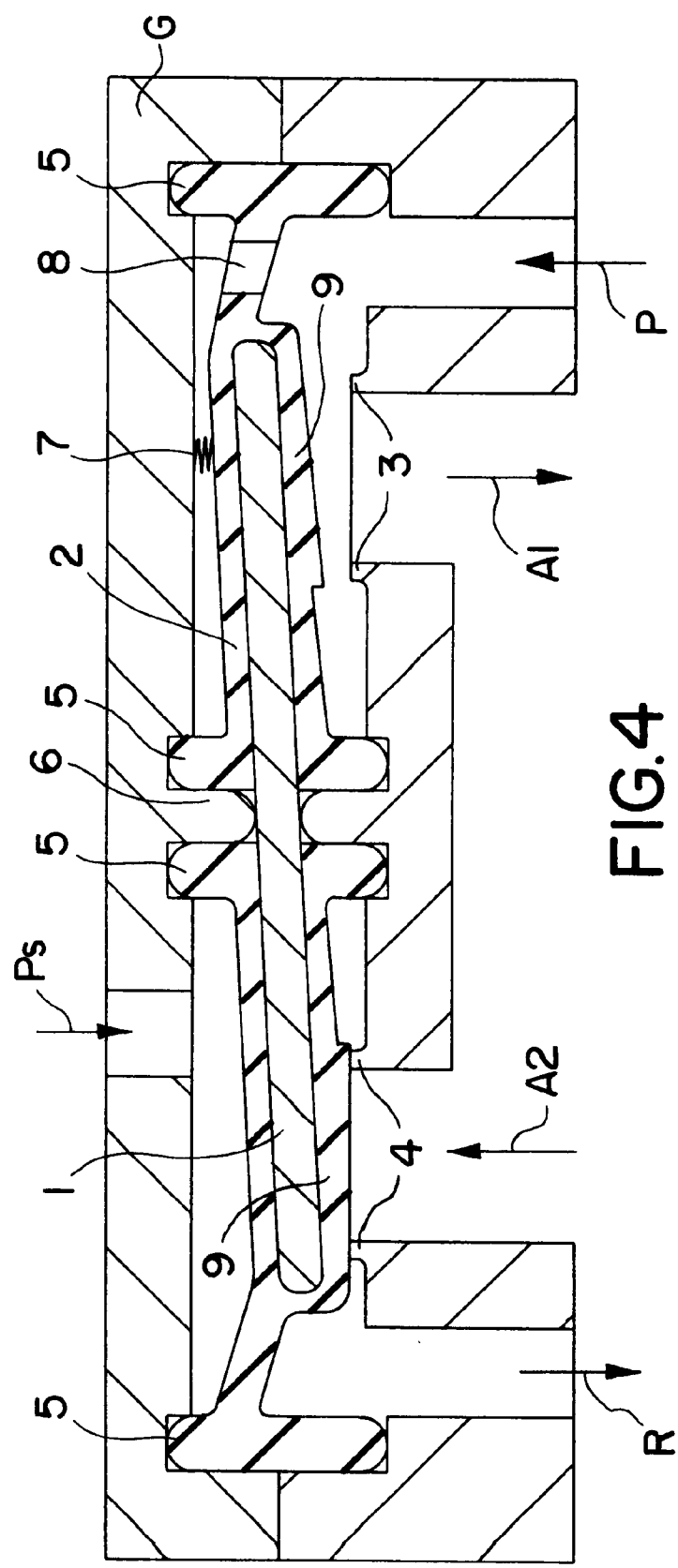
FIG. 4 is the valve of FIG. 3 in operational position.

If a pre-control pressure of a certain size is applied to Ps which exercises a force on the left part of the rocker which is larger than the force exercised by the supply pressure P against on the right handle of the rocker 1, the rocker 1 is moved together with the elastomer sealing element 2 into the position shown in FIG. 4. In this position, the rocker 1 is lifted up from the valve seat 3 and thus, the connection of the supply pressure connection P and the right working connection is created, so that the working volume is impacted with the pressure fluid. The left handle of the rocker 1 is then lying tightly against the valve seat 4 and separates the left working connection A2 from the ventilation connection R.

Through the implementation of the membrane with the circling sealing 5, the rocker is situated directly on the two crosspieces 6, opposite one another, of the housing G which defines the precisely defined and unmovable axis of rotation of the rocker 1. In the holding of the rocker 1, there of course always has to exist some play between the rocker 1 and the crosspieces 6 to make the unhindered movement of the rocker 1 possible. This adds substantially to the precision and security of the switching of the valve according to the invention, as well as to the extension of the maintenance intervals and the life of the valve. Also, the installation and the exchange is made especially easy through the circling sealing 5 of the elastomer sealing element 2 which is simply placed into the corresponding cavity of the lower part of the housing and is fixed tightly upon mounting the upper part of the housing. To facilitate the tilting of the rocker 1, the sharp edges of the crosspieces 6 which come into contact with the rocker 1 are rounded off. However, the circling sealing edge 5 does not necessarily have to be arranged as one piece with the sealing element 2, but instead can also be a separate part which is inserted during the assembly of the rocker valve at, at least, one side of the sealing element 2 between this and the housing G. Such a variation is possible in all embodiments of the rocker 1 and sealing element(s) 2.

Figure 5:
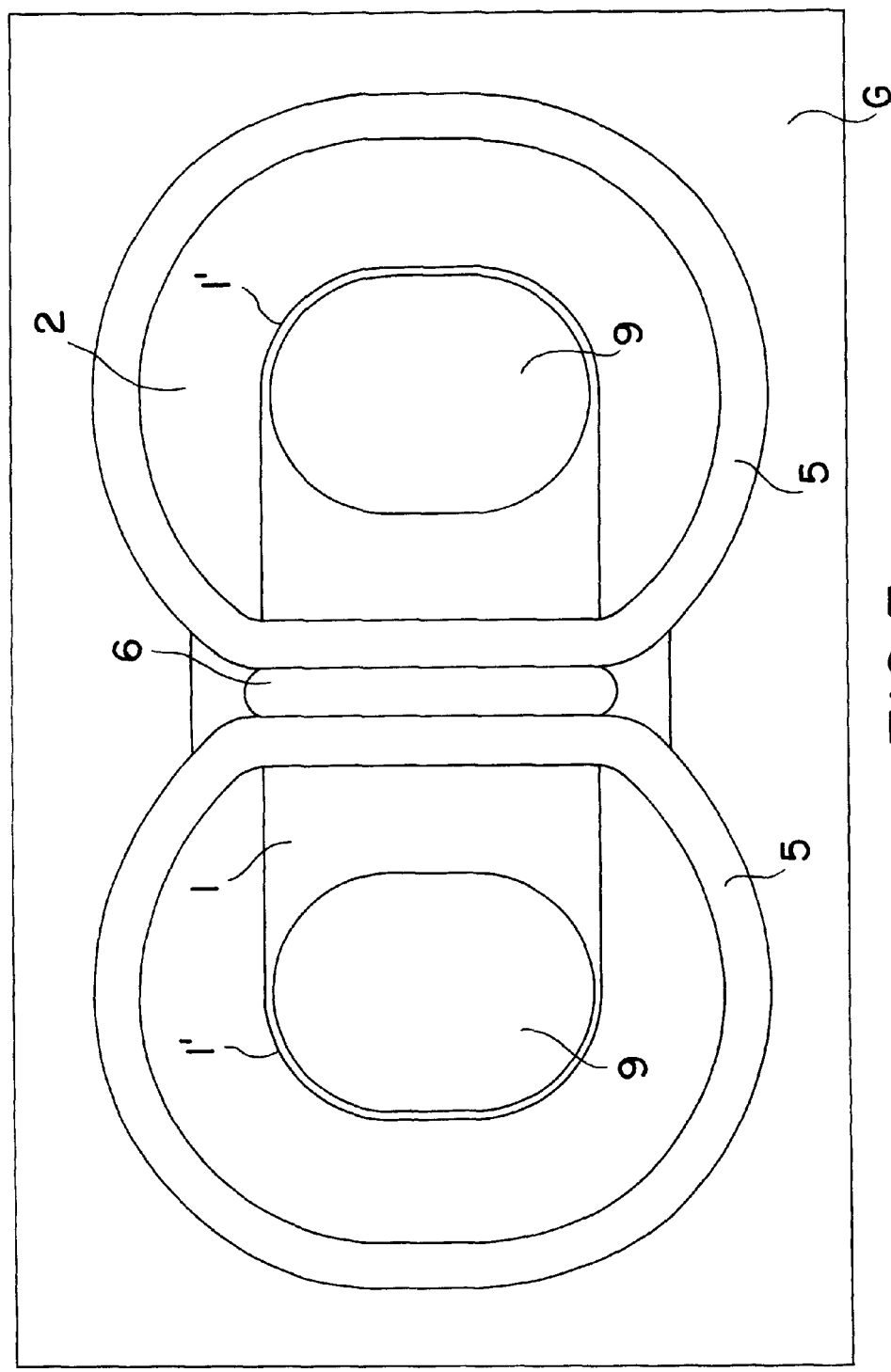
FIG. 5 is a view of the valve of FIGS. 3 and 4, especially of the rocker and the sealing element from the bottom and with the housing opened.

To ensure an especially secure sealing of both of the valve seats 3, 4, the rocker 1 in the elastomer sealing element 2 has such a shape and dimension that the outlets of the or every working connection A is itself covered by the rocker 1 (also refer to the view from the bottom in FIG. 5). In so doing, the elastomer sealing element 2 is, advantageously, provided with especially formed sealing surfaces 9 which can be given, for example, by the thickening of elastomer layer and specifically cover the valve seats 3 and 4 of the working connections A. The sealing surfaces 9 can also exhibit different degrees of thickness at different distances from the axis of rotation in order to compensate for the angle difference between the rocker 1 in the respective final position and the plane of the valve seats. In the case that the valve seats opposite the middle plane of the valve are leaning in the direction of the respective final position corresponding to the direction of the rocker 1, as shown, for example, in FIG. 7, the sealing element 2 can exhibit the same thickness throughout.

Besides the already mentioned advantages, it should also be emphasized that, based on the use of the supply pressure for holding the valve in the closing position, a construction with a minimal number of parts is possible and even the smallest valve measurements and switching paths are achievable at large nominal widths. Also, the embodiments according to the invention allow for an arrangement of the valve with the smallest impairment spaces and, thus, short switching times and precise switching processes.

Figure 6:
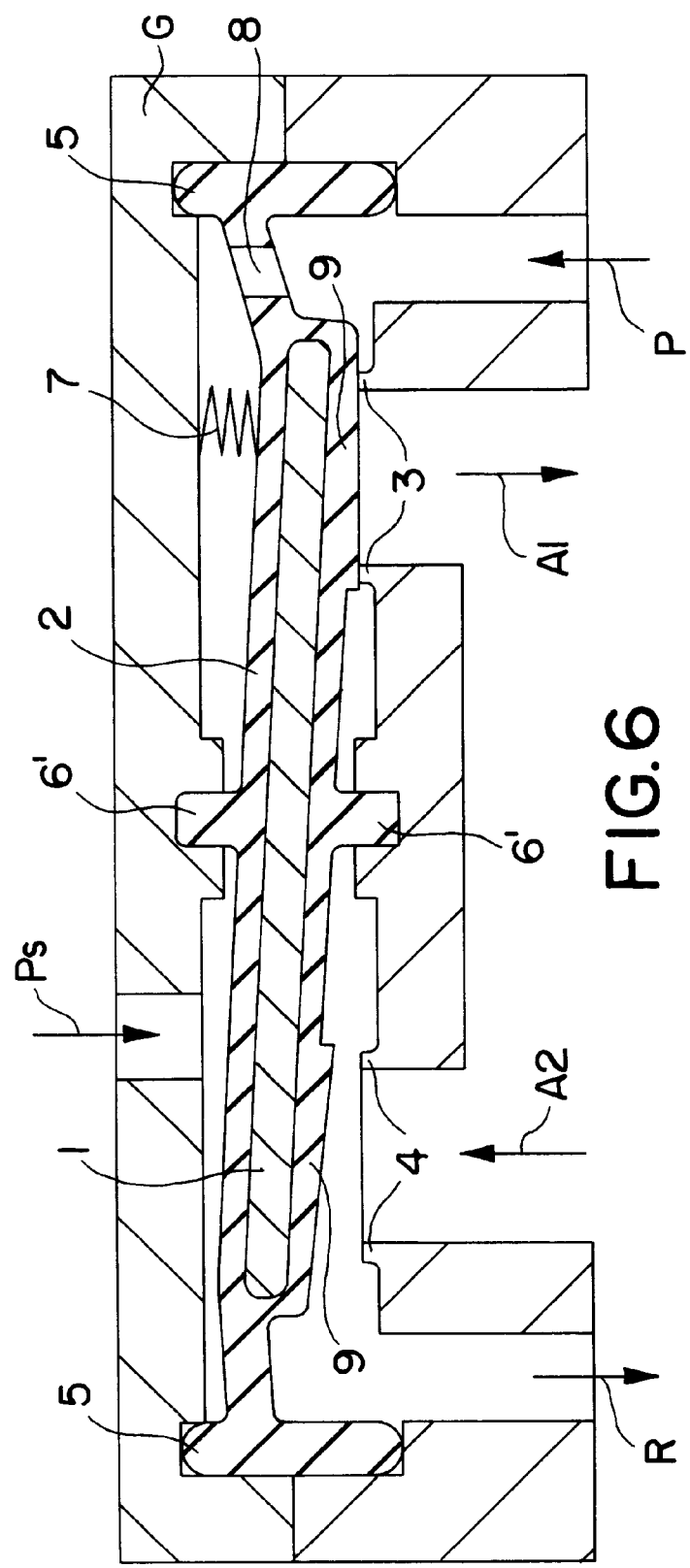
FIG. 6 is an embodiment of the valve according to the invention with other fixation of the rocker.

Still another embodiment of the valve according to the invention is shown in FIG. 6. Here, the rocker 2 is, again, embedded in the sealing element 2 which now, however, exhibits two crosspieces 6' which are held in corresponding groove-like cavities in the housing G. These crosspieces 6' define in this embodiment the axis of rotation of the rocker 1, which axis of rotation is not fixed in such way as in the embodiments described previously. Instead, a certain amount of play for lateral movement and also a parallel sliding of the rocker 1 with respect to the housing G are present. The functionality of the valve is, however, the same as that for the embodiment of FIGS. 3 and 4.

Figure 7:
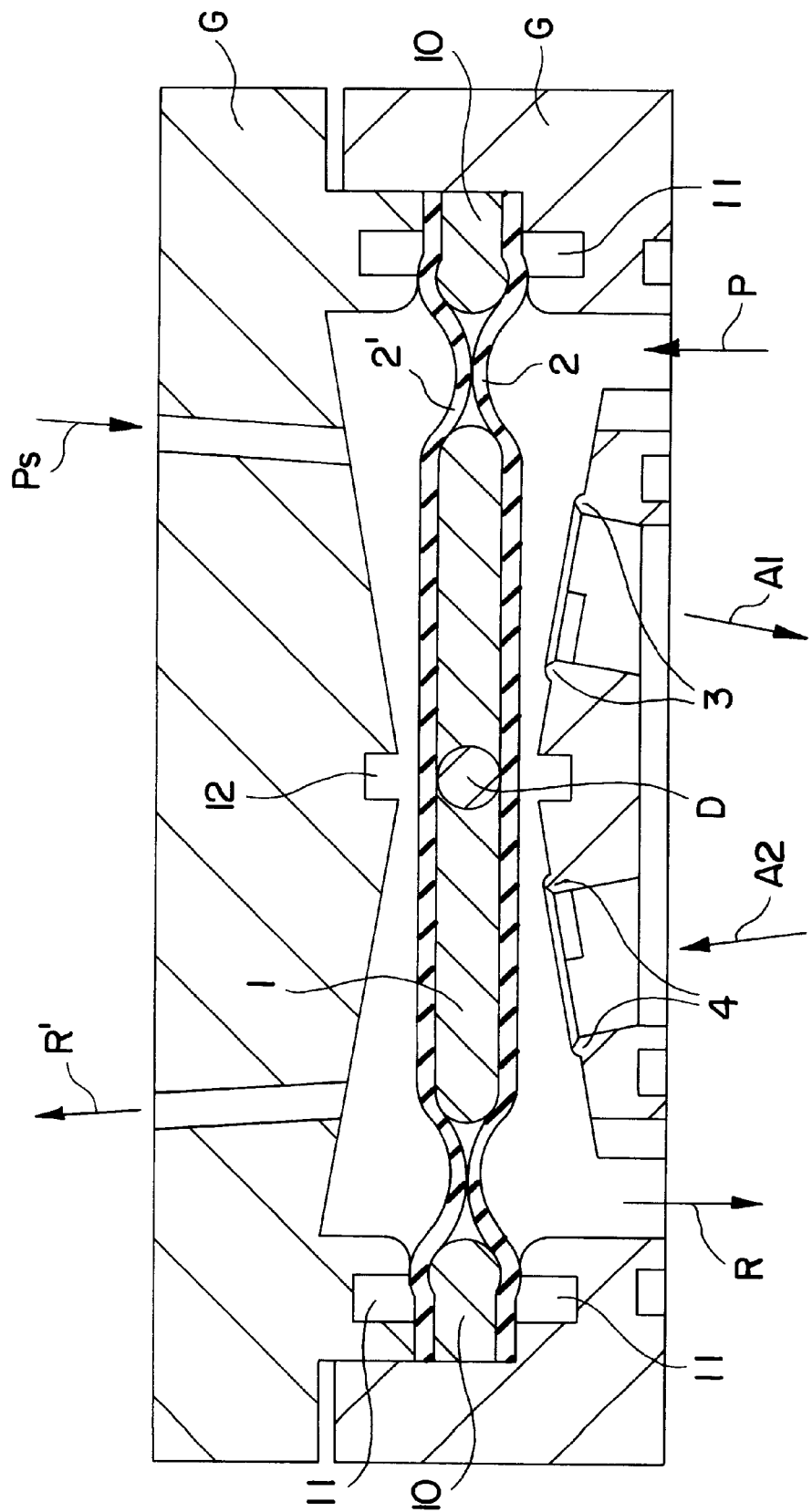
FIG. 7 is a lateral cross-sectional view of a further embodiment of a rocker valve according to the invention with two separate sealing elements.

The embodiment shown in FIG. 7 shows a sandwich-like rocker 1 inserted between two separate sealing elements 2,2', where, in order to facilitate the movement, the sides of the sealing elements 2,2' facing the rocker 1 can be provided with a sliding means or a sliding layer. The sealing elements 2,2' have the same thickness throughout, since both of the valve seats 3,4 of the working connections A1 and A2 are, as corresponding to the final position, leaning in the direction of the rocker 1.

The edges of the sealing elements 2,2' near the housing are held together by a crosspiece at the housing or a separate part 10 at a distance which corresponds to the thickness of the rocker 1, where this part 10 is preferably arranged as a frame which has a storage for an axis of rotation D which crosses through the rocker 1. Thus, in this case, the best possible determination of axis of rotation D of the rocker 1 for the best precision and security of the valve is provided. Besides this, through the frame 10 which, as a one-piece part with an already attached rocker 1 can be mounted during assembly onto the already inserted lower sealing element 2, the mechanical over exertion of the. edges of the sealing element 2,2' can be avoided. At the edges of the sealing element 2,2' and also in the area of the axis of rotation D, for the boundary of the valve spaces, sealing bulges of the sealing elements 2,2' can protrude into the grooves 11 and 12 or separate sealings can be placed into these grooves 11 and 12.

The volume that lies between the lower sealing element 2 and the upper sealing element 2' is, advantageously, ventilated outwardly via the frame 10.

Equally well imaginable is, however, also an embodiment in which the rocker 1 is taken up between two separate sealing membranes 2,2', and these also hold and fix the rocker 1, where no fixed axis of rotation is given.

Figure 8:
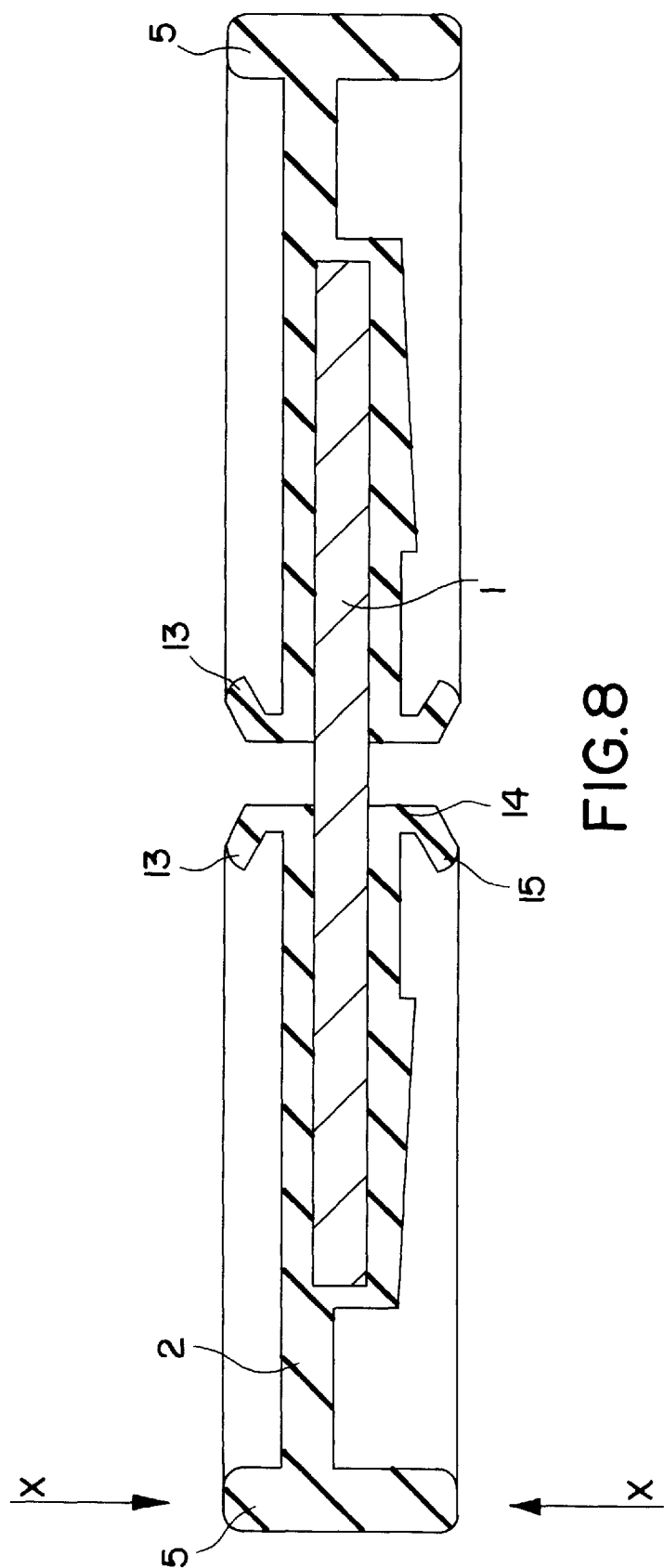
FIG. 8 is a latitudinal cross-section or longitudinal cross-section through an alternative embodiment of a rocker, according to the invention, with a sealing element.

An especially advantageous embodiment of a sealing element 2 with an embedded rocker 1 is shown in FIG. 8 in a cross-section. Since, for achieving a sufficient sealing, the circling sealing 5 has to be pre-stressed, this is best achieved by exercising a pre-stress force in the direction of the arrows X in FIG. 8. Through this, however, a force in the area of the crosspiece 6 is exercised against the rocker 1 which can prevent its movement. Therefore, it is advantageous that the sealing, at least, in the area of the crosspiece 6, is arranged as a lip sealing with sealing lips 13 which consist of a section 14 which runs mainly vertical with respect to the sealing element 2 and a section 15 which is bent away from the crosspiece 6. Through the pre-stress only the sealing lip is "bent" and there is no congestion of the vertical section 14. Therefore, the pre-stress needed for the sealing exercise also only a minimal force on the rocker 1, at which the power and torque ratios are essentially only determined through the pneumatic conditions and are not negatively influenced by the pre-stress.

Figure 9A:
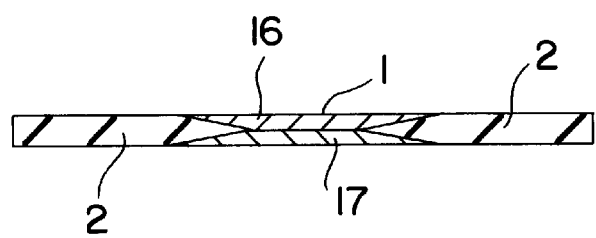
FIGS. 9a and 9b show views of a rocker valve according to a still further embodiment of the invention.
Figure 9B:
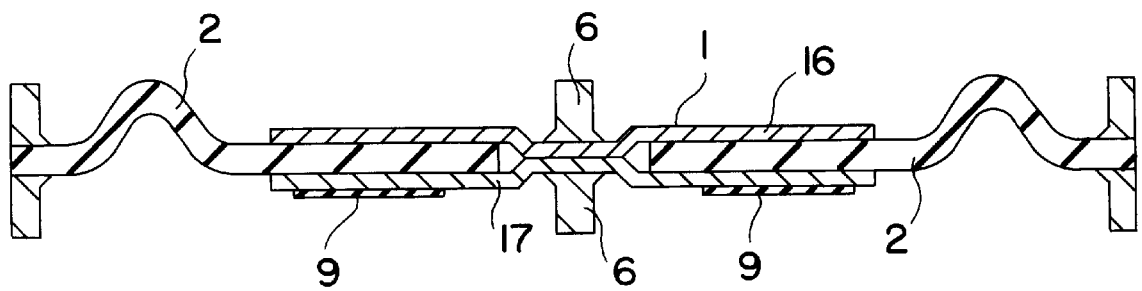

Finally, with reference to FIGS. 9a and 9b, another embodiment for the rocker 1 and its connection with the sealing element 2 is described. The rocker consists, according to this example, of two plates 16, 17 which lie close together in the central area. Outside of this central area, these two plates 16, 17 are at a distance to one another after a trimming and formed between them is a cavity. In this cavity, the edge of the or every sealing element 2 as facing away from the housing G comes to lie down and surrounded like in a sandwich by the plates 15, 17 and is fixed. In the area of the valve seats, a sealing surface 9 can be positioned on the outer side of the lower plate 17.

In a very simple manner, through a combination of a normally open (FIG. 1) and a normally closed (FIG. 2) rocker valve, according to the invention, which are themselves each 3/2-way valves, a 4/2-or a 5/2-way valve can be obtained, that two separate working volumes, such as both of the working spaces of a doubly-acting pneumatic cylinder, are connected alternately with the supply connection and can be impacted with a pressure fluid. Of course, the above-mentioned advantages of rapid switching times, precise switching processes and resistance to wear and tear remain intact, despite the smallest of measurements and simple implementation of the valves. Advantageously, both of these combined values are joined in a common housing.

Furthermore, the possibility of the use of the valve according to the invention as a rapid and exactly responding logic elements with a constructively simple assembly is also contemplated. Thus, in an embodiment according to FIG. 1a and use without supply pressure, a passive OR-element can be realized in that the ventilation connection R' together with the supply pressure connection R are used as one of the inputs and the pre-control connection Ps together with the ventilation connection R as second input and the or every working connection A1,A2 is connected as an output. In this case, the working connection is impacted with pressure, if either one or both of the inputs are impacted with pressure. Otherwise, through switching of the ventilation connection R together with R' as well as of the pre-control connection Ps together with the supply connection P as one input each and again the or every working connection A1, A2 as an exit a passive AND-element can be realized.

An element for the realization of an active IMPLICATION (y-x1 OR NOT (x2)) can be manufactured using a valve element with supply pressure, if its pre-control connection Ps and the ventilation connection R' from the inputs of the logic element and the working connection A1,A2 from the output.

The invention has now been described with reference to certain preferred embodiments. Modifications therein can be made and still fall within the scope of the appended claims.

We claim:

1. Rocker valve with pneumatic pre-control, comprising a housing with pressure connections, in which housing at least one rocker is arranged which is movable between two final positions about a pivoting axis solely by the pressure of at least one pressure medium fed to the valve via supply pressure connections, a sealing element being provided between the edge of the rocker and the inner wall of the housing at least on one side of the rocker as well as along the axis of the rocker, the housing including on each side of the rocker at least one pair of working pressure connections, said pairs of working pressure connections being arranged all on the same side with respect to a plane defined by the rocker, one working pressure connection of each of said pairs being provided with a valve seat oriented towards the rocker, the housing further including at least one further opening on an opposite side to said pairs of working pressure connections with respect to the plane defined by the rocker, through which at least one further opening at least one handle of the rocker can be impacted with pre-control pressure, the rocker in each of its final positions closing one of the valve seats of each pair of working pressure connections while opening the other one at maximal diameter.

2. Rocker valve according to claim 1, wherein the outer edge of the rocker is, at least over a part of its length, distanced from the inner wall of the housing, and including at least one sealing element each extending between the edge of the rocker and the inner wall of the housing.

3. Rocker valve according to claim 1, wherein between the handle of the rocker and the housing, a spring element is inserted impacting this handle of the rocker with a force, by which the rocker in the pressure-less condition of the rocker valve is held in a defined final position and also the movement of the rocker is supported.

4. Rocker valve according to claim 1, wherein the housing defines a chamber therein, wherein said at least one handle divides said chamber into a first chamber part and a second chamber part, wherein a supply pressure connection and one of said pairs of working pressure connections communicate with said first chamber part and said one further opening supplies supply pressure to said second chamber part.

5. Rocker valve according to claim 1, wherein the at least one handle of the rocker includes a channel therethrough.

6. Rocker valve according to claim 1, wherein the axis of the rotation of the rocker is defined by at least one crosspiece of the housing, on which the rocker lies directly.

7. Rocker valve according to claim 6, wherein each crosspiece is sealed off through a section of a circling sealing of the sealing element.

8. Rocker valve according to claim 7, wherein the sealing in the area of the crosspiece is formed as a lip sealing with sealing lips bent away from the crosspiece.

9. Rocker valve according to claim 1, wherein the axis of rotation of the rocker can be defined by at least one crosspiece of said sealing element, each said crosspiece extending into a corresponding cavity of the housing.

10. Rocker valve according to claim 1, wherein the rocker is embedded in a one-piece sealing element.

11. Rocker valve according to claim 1, wherein the rocker is mounted onto the surface of a one-piece sealing element.

12. Rocker valve according to claim 1, wherein the rocker is embedded between two separate sealing elements, wherein the sealing elements are held at a distance to one another in the insertion area by means of one housing element.

13. Rocker valve according to claim 12, wherein the space between both of the sealing elements is ventilated.

14. Rocker valve according to claim 12, wherein said housing element is a frame which also has a bearing for an axis of rotation of the rocker.

15. Rocker valve according to claim 1, wherein the rocker has, at least in the area of the edge, a cavity in which the edge of the sealing element facing away from the housing is held as inserted and sealed off.

16. Rocker valve according to claim 15, wherein the rocker consists of two plates lying over and directly against one another, wherein the outer edges of the plates are at a distance to one another and the inner edge of the sealing element is inserted in between like a sandwich.

17. Rocker valve according to claim 1, wherein the rocker is expandable such that every opening of every working connection is covered.

18. Rocker valve according to claim 1 as a logic element.

19. Valve according to claim 1, wherein the sealing element is totally separating all pressure connections on opposite sides of the rocker with respect to the plane thereof, and wherein at least one further opening is provided on each side of the rocker with respect to its pivoting axis and on the side opposite to the pairs of pressure connections with respect to the plane of the rocker.

20. Valve according to claim 1, wherein one pressure connection of each pair of pressure connections on each side of the rocker is a working connection connected to a pneumatic working device and the other pressure connection of each pair of pressure connections is a supply connection or a ventilation connection, respectively, the working connections both provided with the valve seats closable by the rocker.

21. Valve according to claim 20, wherein an effective area of application of pressure against all movable parts of the valve on the side of the rocker with the supply connection is larger than an area of the working connection on the other side of the rocker, said working connection being on the same side as the ventilation connection.

22. Valve according to claim 1, wherein on one side of the rocker the pair of pressure connections is closed.

23. Valve according to claim 1, wherein a passage is provided connecting one pressure connection of one of the pairs of pressure connections with one of the further openings on the side opposite the pairs of pressure connections with respect to the plane defined by the rocker.

24. Valve according to claim 1, wherein the rocker is positioned substantially symmetrical about its axis of rotation.

* * * * *